United States Patent Office 3,517,292
Patented June 23, 1970

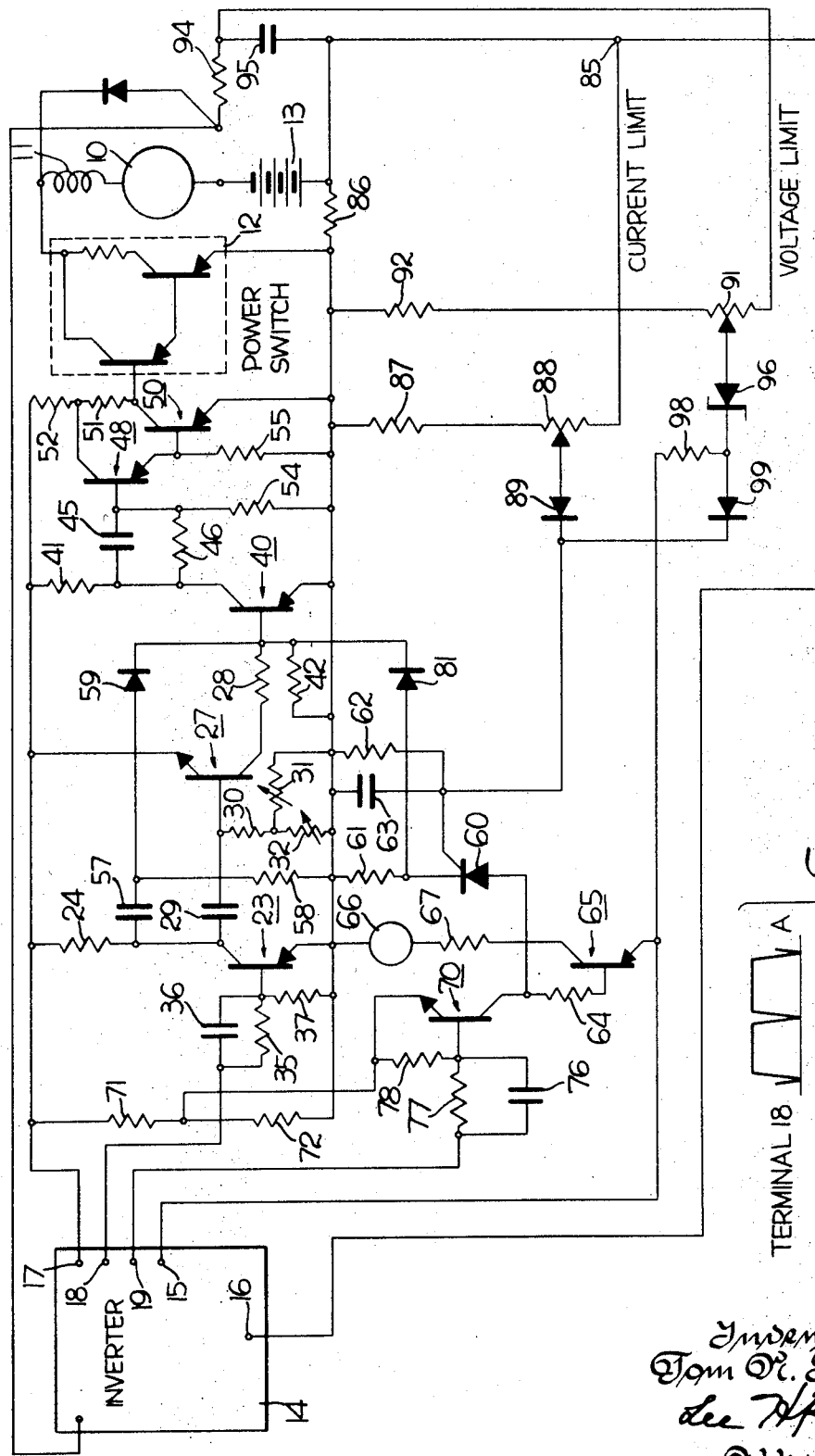

3,517,292
TRANSISTOR POWER SWITCHING CIRCUIT FOR PULSE MODULATION SYSTEM
Tom N. Thiele, Oconomowoc, Wis., assignor to Allis-Chalmers Manufacturing Company, Milwaukee, Wis.
Continuation of application Ser. No. 719,463, Apr. 8, 1968, which is a division of application Ser. No. 232,462, Oct. 23, 1962. This application Oct. 20, 1969, Ser. No. 867,964
Int. Cl. H03k 17/06
U.S. Cl. 318—341                          1 Claim

ABSTRACT OF THE DISCLOSURE

A pulse modulation control system for energizing a DC motor from a battery has means including a transistor monostable circuit with adjustable time constant elements for producing a succession of unidirectional pulses, manual means for varying the time constant elements of said monostable circuit to control the time duration of said pulses and thereby vary motor speed, and a power switch controlled by said pulses for applying variable duty cycle power pulses to said battery from said motor. The power switch includes a power transistor between the battery and the motor and a driver transistor for the power transistor with a resistance in the collector circuit of the power transistor to forward bias the collector base junction of said power transistor and maintain it in the saturated region of operation and thereby reduce power dissipation in the power transistor.

---

This application is a continuation of my application Ser. No. 719,463 entitled "Transistor Power Switching Circuit for Pulse Modulation System" filed Apr. 8, 1968 which was a division of my copending application entitled Pulse Width Modulator With Pulse Width Limiting, Ser. No. 232,462, filed Oct. 23, 1962, now abandoned.

This invention relates to systems that utilize transistor pulse modulation circuits to control the effective electrical energy delivered from a direct current source to a direct current motor.

It is conventional to control the operation of a direct current motor from a power source such as a battery or a fuel cell by varying a resistance connected in series with the motor and the power source to control the effective voltage delivered to the motor. That portion of the power consumed in the resistance, although necessary for control, does not contribute to the useful work output, generates unwanted heat, and lowers the efficiency of the system. In order to avoid such power loss and inefficiency, systems have been devised that use a pulse producing circuit to turn a switch off and on at rapid cyclic intervals to vary the total effective voltage applied to the direct current motor. One of the most satisfactory ways to modulate power in an electrical system is to operate a static power switch to break up the load voltage wave form into a series of on and off pulses. Controlling the power switch for the proper relation between the on time and the off time establishes the desired average voltage at the load.

A significant limiting requirement for the transistor power switches of such motor controls is that the transistors must have sufficient base drive to operate in the switching mode where their dissipation is low. It is also desirable to utilize transistor circuits that have high gain and can carry sufficient current for motor control applications. An apparently desirable circuit that has high gain characteristics is one using a driver transistor having its emitter connected to the base of an output transistor, often termed a Darlington compound circuit. However, the problem of maintaining the output transistor in saturation seriously limits the current handling capacity of this circuit, and known pulse width modulation systems have been unable to utilize this circuit for DC motor control and require means responsive to the voltage across the transistor power switch to control the base drive to the power switch to maintain it in the saturated region of operation.

It is an object of the invention to provide an improved pulse modulation control system for direct current motors having transistor power switching means of high gain and high current carrying capacity that automatically adjusts the biasing of the power transistor in accordance with the load current to maintain the power transistor in the saturated mode of operation.

Other objects and advantages will be apparent from the following detailed description of an embodiment of this invention.

FIG. 1 is a schematic circuit diagram of a preferred embodiment of the invention used in the control of a motor for a fork lift truck or similar device; and FIG. 2 shows a series of wave forms associated with various points of the circuit shown in FIG. 1.

AN ASSOCIATED SYSTEM

FIG. 1 shows the circuit of the invention in a system for controlling the speed of a fork lift truck having a DC motor with an armature 10 and a series field winding 11. A power switch 12 connects the motor to a source 13 in response to a signal at the input of the power switch. Power switch 12 preferably comprises a number of power transistors connected in parallel and driver transistors connected as the single power transistor and driver are shown in FIG. 1. A resistance 20 is connected between the collector of the power transistor and the collector of the driver transistor of the power switch 12 and in a series circuit with the motor series field winding 11, the armature 10, the battery 13, and the emitter-collector circuit of the power transistor. The truck may include a device such as an inverter 14 that is connected to source 13 to provide electrical power for accessories of the truck. Inverter 14 may be connected to provide a source of filtered DC for the pulse width modulating circuit at positive terminal 15, common terminal 16 and negative terminal 17. Inverter 14 preferably also provides full wave rectified positive unfiltered DC at terminal 18 and negative full wave rectified unfiltered DC at terminal 19. The unfiltered DC, shown in FIG. 2, provides synchronized positive and negative timing pulses for the pulse width forming circuit The components of the system that have been described so far illustrate applications for the pulse width modulating circuit Many other applications will be apparent after the pulse width modulating and limiting circuit has been described in connection with the specific system of FIG 1, and other applications will be suggested later in this description

THE PULSE FORMING CIRCUIT

The pulse width modulating and limiting circuit of this invention includes a monostable circuit that establishes the position of the leading edge of a pulse with respect to a periodic reference This part of the modulator is generally similar to part of the circuit of Thiele application Ser. No. 114,260, assigned to the assignee of this invention. The circuit includes a transistor 23 that has its emitter terminal connected to the common terminal 16 of source 14 and has its collector terminal connected to the negative terminal 17 of source 14 by a collector resistor 24. As will be explained later, transistor 23 is connected to be turned on by a timing pulse at the beginning of each period. The pulse forming circuit includes a second transistor 27 that has its emitter terminal connected to negative terminal 17 of source 14 and has its collector terminal connected to terminal 16 through a resistor 28 and the base-emitter circuit of a transistor 40 in the amplifying stage that will be described later. A capacitor 29 connects the collector terminal of transistor 23 to the base terminal of transistor 27. When transistor 23 turns on momentarily at the beginning of each period, it connects capacitor 29 to be charged to the potential of terminals 16, 17 in a circuit that comprises the emitter-collector circuit of transistor 23 and the base-emitter circuit of transistor 27. When transistor 23 turns off, very shortly after the beginning of the timing period, resistor 24 connects the positively charged terminal of capacitor 29 to the negative terminal 17, and the voltage across capacitor 29 appears between the base and emitter terminals of transistor 27 in a polarity to turn off transistor 27. An adjustable resistance circuit is connected to discharge capacitor 29 at a selected rate so that transistor 27 will turn on again after a selected time delay. The drawing illustrates the adjustable resistance circuit as the series combination of a fixed resistor 30 and a variable resistor 31 that connect the base terminal of transistor 27 to terminal 16 and a variable resistor 32 that is connected between common connection of resistors 30, 31 and positive terminal 16. Preferably variable resistor 32 is arranged to be manually adjustable to control the output of the circuit and variable resistor 31 is intended to be adjusted only to trim the circuit. At the end of the timing period when capacitor 29 has discharged to cause the base of transistor 27 to become positive with respect to the emitter, transistor 27 turns on.

THE TIMING PULSE CIRCUIT

Any signal source is connected to turn transistor 23 on momentarily at the beginning of each period. In the system of FIG. 1 the full wave rectified, unfiltered, output at terminal 18 of inverter 14 provides a series of narrow negative going pulses (FIG. 2) where commutation occurs in the inverter. These voltage spikes will be called timing pulses.

The parallel combination of a resistor 35 and a capacitor 36 connect the base terminal of transistor 23 to positive unfiltered terminal 18. A resistor 37 connects the base terminal of transistor 23 to common terminal 16. Capacitor 36 and resistor 35 speed up turning on transistor 23. Also, capacitor 36 charges to an average value with the terminal connected to the base somewhat negative with respect to terminal 18 so that the base terminal of transistor 10 goes negative during the voltage spikes although the full wave rectified form at terminal 18 does not go more negative than zero.

THE AMPLIFIER

A suitable circuit is connected to receive the rectangular current wave form produced in the collector circuit of transistor 27 and to receive other inputs that will be described later and to amplify these signals sufficiently to operate power switch 12. The amplifier that the drawing illustrates comprises a transistor 40 having its emitter connected to the common terminal 16 and its collector connected to negative terminal 17 by a resistor 41. The base of transistor 40 is connected to the collector of transistor 27 of the pulse forming circuit by means of resistor 28 in the pulse forming circuit. A resistor 42 connects the base of transistor 40 to the common terminal 16 to reduce off leakage at higher temperature by providing an alternate $I_{co}$ path. When transistor 27 turns on at the end of the timing period, transistor 40 also turns on. The parallel combination of a capacitor 45 and a resistor 46 couples the potential at the collector terminal of transistor 40 to the base terminal of a transistor 48. The collector terminal of transistor 48 is connected to the collector circuit of a transistor 50 and the emitter terminal of transistor 48 is connected to the base of transistor 50. Resistors 51, 52 connect the collector of transistor 50 to negative terminal 17, and the emitter of transistor 50 is connected to common terminal 16. Resistor 51 in the load circuit of transistor 50 keeps transistor 50 in saturation when it is turned on, and similarly the resistance 20 connected at one side to the collector of the power transistor of power switch 12 so that said resistance is in series with the emitter-collector circuit of the power transistor, the series field winding 11, the armature 10, and the battery 13 keeps the power transistor in saturation. Resistors 54, 55 connect the base terminals of transistors 48 and 50 to common terminal 16 to decrease the turn off time of transistors. When transistor 48 turns on, it conducts the base current for transistor 50 in its emitter-collector circuit and it turns on transistor 50. Thus, the amplifier of FIG. 1 produces a negative output at the collector terminal of transistor 50 when transistor 27 is on and it produces a zero output when the pulse forming circuit is in its unstable mode and transistor 27 is off.

THE BLANKING CIRCUIT

When transistor 23 turns on momentarily at the beginning of each timing period, it conducts in a circuit with capacitor 29 and the base-emitter junction of transistor 27 and thereby turns on transistor 27 momentarily. As the circuit has been described so far the timing pulse would appear at the output of the amplifier. Without pulse width limiting this is acceptable because transistor 27 conducts until the end of the timing period and the short timing pulse would merge with the power output pulse. As will be explained later, the pulse width limiter operates to advance the trailing edge of the pulse so that it is spaced from the point where the timing pulse would occur. Ordinarily it is undesirable to turn on power switch 12 momentarily at the timing pulse.

A capacitor 57 and a resistor 58 are connected in series across the emitter-collector terminals of transistor 23 to receive the timing pulse. During the relatively long time each period that transistor 23 is turned off, capacitor 57 charges in series with resistor 24 and resistor 58 so that the terminal connected to the collector of transistor 23 is negative and the terminal connected to resistor 58 is positive (this is the same condition as capacitor 29). When transistor 23 turns on momentarily, it connects the negatively charged terminal of capacitor 57 to common terminal 16 so that its positively charged terminal is positive with respect to terminal 16 by the voltage source 14. This is the proper polarity to turn off transistor 40 in opposition to the collector current of transistor 27 which tends to turn on transistor 40 during the timing pulse. A diode 59 couples the positively charged terminal of capacitor 57 to the base terminal of transistor 40. Diode 59 isolates the base terminal of transistor 40 from resistor 58 and capacitor 57 except for the blanking pulse.

THE PULSE WIDTH LIMITING CIRCUIT

The circuit of this invention limits the width of each pulse in response to circuit conditions during the same period. This circuit indicates the time at which a preset condition occurs and in this respect is the dual of a sample data system which indicates the value of a quantity at a preset time. The pulse width limiting circuit includes a controlled rectifier 60 that is gated at the appropriate time in the period to apply a turn off potential to the base terminal of transistor 40. A resistor 61 connects the cathode terminal of controlled rectifier 60 to common terminal 16. A resistor 62 and a capacitor 63 are connected between the gate terminal and common terminal 16 to prevent controlled rectifier 60 from turning on in response to extraneous pulses. Suitable load means connects the anode terminal of controlled rectifier 60 to positive terminal 15 of source 14. In the circuit of FIG. 1, the anode terminal is connected to terminal 15 through a resistor 64 and a base-emitter circuit of a transistor 65. Transistor 65 turns on when controlled rectifier 60 turns on, and it turns off when controlled rectifier 60 turns off. Transistor 65 is connected to drive an indicator lamp 66 through a resistor 67. As will be explained, lamp 66 turns on to warn the operator of the system that some load condition exists that requires pulse width limiting.

A transistor 70 is connected to apply a negative turn off pulse to the anode of controlled rectifier 60 to reset controlled rectifier 60 at the end of each period. The collector terminal of transistor 70 is connected to the anode terminal of controlled rectifier 60, and the emitter terminal of transistor 70 is connected to a suitable point of negative potential with respect to common terminal 16. The emitter terminal of transistor 70 may be connected to the common connection of two resistors 71, 72 that are connected between the terminals 16, 17 of source 14. Transistor 70 is coupled to terminal 19 of source 14 to receive positive going timing pulses by means of a capacitor 76 and two resistors 77, 78 that are similar to the timing pulse circuit already described. When transistor 70 turns on it conducts in series with resistor 64 and the base-emitter circuit of transistor 65 between positive terminal 15 and the negative common connection of resistors 71, 72. The negative potential between the two resistors 71, 72 appears at the anode terminal of controlled rectifier 60 and turns it off.

A diode 81 connects the cathode terminal of controlled rectifier 60 to the base terminal of transistor 40. Diode 59 in the blanking circuit and diode 81 form an OR circuit that turns off transistor 40 when a positive voltage is applied to the cathode of either diode 59, 81.

THE OVERCURRENT INDICATING SECTION

Controlled rectifier 60 is gated to limit the width of pulses in response to various circuit conditions such as the load current. With an inductive load such as windings 10, 11, the load current increases continuously during the on time (the time constant of the load is much longer than the switching period) and the load current may exceed the value at which the power switch transistors can be held in saturation. The control turns off the power switch transistors before this condition is reached. Terminal 85 of the current limiting section is connected to receive a voltage that is proportional to the load current. FIG. 1 shows a schematic resistor 86 that represents the low resistance that is distributed in the heavy conductors that connect power switch 12 to source 13. A fixed resistor 87 and a poteitiometer 88 are connected across the terminals of conductor 86 to apply a measure of this voltage to the anode of a diode 89. Diode 89 conducts in series with the gate-cathode circuit of controlled rectifier 60 according to the potential at the anode of diode 89 and the volt-ampere characteristics of controlled rectifier 60 and diode 89. These voltage ampere characteristics provide that over a significant range of voltage at terminal 85, the gate voltage of controlled rectifier 60 is not sufficient to turn on the controlled rectifier. When the potential at terminal 85 rises sufficiently (depending on the position of the slider of potentiometer 88), the voltage at the gate of controlled rectifier turns on the controlled rectifier. Thus, the voltage at the anode terminal of diode 89 that is required to turn on controlled rectifier 60 can be considered to be a reference for the collector current of the power transistor of power switch 12. When diode 89 turns on, it gates controlled rectifier 60 which produces a voltage drop across resistor 61. Diode 81 couples the positive voltage at the cathode terminal of controlled rectifier 60 to the base terminal of transistor 40 and turns off transistor 40 and thereby turns off power switch 12.

THE UNDERVOLTAGE INDICATING SECTION

A potentiometer 91 and a fixed resistor 92 are connected in series to receive a measure of the battery voltage. As the drawing illustrates the invention, a resistor 94 and a capacitor 95 are connected to decouple potentiometer 91 and resistor 92 from other components that are connected to the battery. A Zener diode 96 has its anode terminal connected to the slider of potentiometer 91 and has its cathode terminal connected by means of resistor 98 to any suitable positive potential point such as terminal 15. The slider of potentiometer 91 is adjusted so that Zener diode 96 conducts in its reverse direction when the battery has at least the minimum acceptable voltage. Zener diode 96 maintains the potential at its cathode terminal at a fixed value more positive than the slider terminal. Thus, when the slider is adjusted to be somewhat more negative than the value of the voltage across Zener diode 96, the cathode terminal is somewhat negative with respect to common terminal 16. As the battery voltage falls, the potential at the slider and at the cathode terminal of Zener diode 96 becomes less negative with respect to terminal 16. When the slider is properly adjusted, the potential at the cathode terminal at Zener diode 96 becomes slightly positive when the battery voltage has fallen to the value at which pulse width limiting should take place. A diode 99 connects the cathode terminal of Zener diode 96 to the gate terminal of controlled rectifier 60. Diodes 89 and 99 make up an OR circuit and either low voltage or high current will turn on one of the diodes 89, 99 and gate controlled rectifier 60.

OPERATION

Suppose that the motor is going to be energized to drive a heavy load at low speeds where the load would require more current than power switch 12 can provide safely. When the speed control potentiometer 32 is set for zero speed, the delay that is established by capacitor 29 and resistors 30, 31, 32 is longer than the period of the timing signals and capacitor 29 remains continuously charged sufficiently to turn off transistor 27 except when transistor 23 turns on in response to the timing pulse, and the blanking pulse blanks out this signal at the base of transistor 40. As the operator advances speed potentiometer 32, the circuit produces shorter and shorter delays before turn on, and the power switch turns on sooner in each period and thus remains on longer. The current in winding 10 ad 11 starts at zero or at some other value at the begining of each turn on portion of each period and increases exponentially until power switch 12 turns off. If the power switch is turned on very early in the period and the motor is stalled or turning very slowly, the current may reach the value for which potentiometer 88 is set to gate controlled rectifier 60. When the current limit signal gates controlled rectifier 60, controlled rectifier 60 turns off amplifying transistor 40 and power switch 12 and prevents the peak load current from increasing beyond the value established by the position of the slider of potentiometer 88. If the operator attempts to apply power to the motor while it is stalled, the pulse forming circuit would advance the leading edge of the pulse and the current limit section advances the trailing edge of the pulse correspondingly. The pulse would have a uniform width that corresponds to the peak current in the load circuit. As the motor begins to move, the current limit section would retard the trailing edge of the pulse and thus widen the pulse. The operator, of course, could adjust speed control rheostat 32 to retard the leading edge of the pulse to limit the speed of the truck.

The operation of the pulse width limiting circuit during low battery voltage is similar to the current limiting operation that has just been described. When the battery is nearly discharged, its internal resistance is high and the battery voltage falls off during each period. The slider of potentiometer 91 is set so that switch 12 turns off when the battery voltage falls enough to reduce the base drive in power switch 12.

OTHER EMBODIMENTS

As the circuit has been described so far, power switch 12 comprises transistors which are controlled either to turn on or to turn off according to the potential at the collector of transistor 50. Transistor 40 combines all of the inputs that either turn on or turn off power switch 12. Switch 12 can also comprise devices such as controlled rectifiers which turn on in response to a gate voltage and turn off in response to an anode voltage. For a power switch comprising controlled rectifiers, the outputs of transistor 27 and controlled rectifier 60 are separately connected to control the gate potential and the anode potential of the controlled rectifiers in power switch 12. Circuits for turning off controlled rectifiers in response to the signal at the anode of controlled rectifier 60 are well known.

The pulse limit portion of this circuit can operate with any signal that changes measurably during the on time. (If the signal does not change measurably, controlled rectifier 60 would either turn on at the beginning of a period or not turn on at all during a period.) Many devices have electrical or mechanical time constants that would cause the current or voltage to change measurably during each on time. The control can be connected to respond to nonelectrical characteristics by means of suitable sensors that produce electrical signals.

It is well known to connect transistors or controlled rectifiers or other devices to form a power switch for an alternating current system. When the pulse width modulating and limiting circuit of this invention is used in an alternating current system, it is preferable to full wave rectify a measure of the system voltage to provide timing pulses for transistors 27 and 70 at voltage zeros in the alternating current system. This wave form is similar to the rectified square wave form of FIGS. 2A and 2B.

A very significant advantage of this circuit as it has been described so far is that all of the transistors operate in the switching mode and not in the linear mode. This feature makes the control less sensitive to variations in the voltage at terminals 15, 16, 17 and to variations in the characteristics of the transistors. Potentiometer 32 makes the circuit changes to vary the turn on point. Other resistance means such as a photocell may be substantial for the mechanically variable resistor that has been suggested. To vary the turn on point in response to electrical signals, a transistor operating in its linear mode can be connected to control the discharge of capacitor 29.

The single embodiment of the invention and the variations that have been described in detail will suggest to those skilled in the art many applications of this circuit and appropriate modifications of the disclosed circuit, which the claim is intended to cover.

The embodiments of the invention in which an exclusive property or privilege is claimed are defined as follows:

1. A pulse width modulation system comprising,
a DC motor,
a DC source,
means for producing a succession of pulses,
transistor power switch means controlled by said pulses for applying variable duty cycle pulses to said motor from said power source, said power switch means including a power transistor and a driver transistor each of which has a base, an emitter and a collector, a resistance connected at one side to the collector of said power transistor, the emitter-collector circuit of power transistor being connected in series with said resistance and said DC source and said motor, the emitter of said driver transistor being connected to the base of said power transistor to apply current flow thereto and the collector of said driver transistor being connected to the other side of said resistance, whereby substantially all current flow through said driver and power transistors is directed to said DC motor, said succession of pulses being applied to the base of said driver transistor and said resistance forward biasing the collector-base junction of said power transistor to maintain said power transistor in the saturated mode of operation.

References Cited
UNITED STATES PATENTS

| 3,064,175 | 11/1962 | Vergez | 318—341 |
| 3,210,561 | 10/1965 | Ullman | 307—315 |
| 3,213,343 | 10/1965 | Sheheen | 318—341 |

ORIS L. RADER, Primary Examiner

T. LANGER, Assistant Examiner

U.S. Cl. X.R.

307—315